United States Patent
Kim et al.

(10) Patent No.: US 9,557,610 B2
(45) Date of Patent: Jan. 31, 2017

(54) DISPLAY DEVICE

(71) Applicant: Samsung Display Co., Ltd., Yongin, Gyeonggi-Do (KR)

(72) Inventors: Si Kwang Kim, Daegu (KR); Tae Gyun Kim, Seoul (KR); Hyoung Sub Lee, Yongin-si (KR); Woo Yong Sung, Seoul (KR); Tae Woon Cha, Seoul (KR); Sang Gun Choi, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 163 days.

(21) Appl. No.: 14/459,463

(22) Filed: Aug. 14, 2014

(65) Prior Publication Data
US 2015/0234215 A1  Aug. 20, 2015

(30) Foreign Application Priority Data
Feb. 18, 2014 (KR) .................. 10-2014-0018651

(51) Int. Cl.
  *G02F 1/1341*  (2006.01)
  *G02F 1/1335*  (2006.01)
  *G02F 1/1333*  (2006.01)
  *G02F 1/1339*  (2006.01)
  *G02F 1/1362*  (2006.01)
  *G02F 1/1337*  (2006.01)

(52) U.S. Cl.
  CPC ......... *G02F 1/1341* (2013.01); *G02F 1/13394* (2013.01); *G02F 1/133377* (2013.01); *G02F 1/133512* (2013.01); *G02F 1/136209* (2013.01); *G02F 1/1337* (2013.01)

(58) Field of Classification Search
  CPC . G02F 1/133512; G02F 1/1339; G02F 1/1341
  See application file for complete search history.

(56) References Cited

U.S. PATENT DOCUMENTS

| | | | |
|---|---|---|---|
| 6,469,761 B1 | 10/2002 | Drabik et al. | |
| 2014/0198290 A1* | 7/2014 | Lim | G02F 1/133377 349/143 |

FOREIGN PATENT DOCUMENTS

| | | |
|---|---|---|
| KR | 1020120026880 A | 3/2012 |
| KR | 1020130042307 A | 4/2013 |

* cited by examiner

*Primary Examiner* — Dung Nguyen
(74) *Attorney, Agent, or Firm* — Cantor Colburn LLP

(57) ABSTRACT

Provided is a display device capable of preventing a liquid crystal from being left outside a microcavity. The display device includes: a substrate; a pixel electrode formed on the substrate; a roof layer formed on the pixel electrode so as to be spaced apart from the pixel electrode with a plurality of microcavities therebetween; a light blocking member positioned between two microcavities of the plurality of microcavities, overlapping with a first edge of one microcavity of the two microcavities, and not overlapping with a second edge of the other microcavity; an injection hole exposing a part of the microcavity; a liquid crystal layer filling the microcavity; and an encapsulation layer formed on the roof layer so as to cover the injection hole to seal the microcavity.

17 Claims, 12 Drawing Sheets

DISPLAY DEVICE

DISPLAY DEVICE

This application claims priority to and the benefit of Korean Patent Application No. 10-2014-0018651 filed on Feb. 18, 2014, and all the benefits accruing therefrom under 35 U.S.C. §119, the entire contents of which are incorporated herein by reference.

BACKGROUND (a) Field

The invention relates to a display device, and more particularly, to a display device capable of reducing or effectively preventing a liquid crystal from being outside a microcavity.

(b) Description of the Related Art

The liquid crystal display which is one of the most common types of flat panel displays currently in use, includes two sheets of display panels with field generating electrodes such as a pixel electrode, a common electrode and the like, and a liquid crystal layer interposed between the display panels. The liquid crystal display generates an electric field in the liquid crystal layer by applying a voltage to the field generating electrodes, determines alignment of liquid crystal molecules of the liquid crystal layer through the generated electric field, and controls polarization of incident light, thereby displaying images.

The two sheets of display panels of the liquid crystal display may include a thin film transistor array panel and an opposing display panel. In the thin film transistor array panel, a gate line transferring a gate signal and a data line transferring a data signal are formed to cross each other, a thin film transistor connected with the gate line and the data line, a pixel electrode connected with the thin film transistor, and the like may be disposed. In the opposing display panel, a light blocking member, a color filter, a common electrode and the like may be disposed. In some cases, the light blocking member, the color filter and the common electrode may be disposed on the thin film transistor array panel.

However, in a liquid crystal display in the related art, two sheets of substrates are used, and respective constituent elements are formed on the two sheets of substrates. As a result, there are problems in that the display device is relatively heavy and thick, has a relatively high cost and has a long process time.

SUMMARY

In a liquid crystal display, two sheets of substrates may be used, and respective constituent elements are formed on the two sheets of substrates. As a result, there are problems in that such a display device including the two sheets of substrates is relatively heavy and thick, has a relatively high cost and has a long process time. Therefore, there remains a need for an improved liquid crystal display being relatively light and thin, and having a decreased cost and short process time.

One or more exemplary embodiment of the invention provides a display device having advantages of reducing a weight, a thickness, cost and a process time thereof, by manufacturing the display device by using one single substrate.

Further, one or more exemplary embodiment of the invention provides a display device having advantages of reducing or effectively preventing a liquid crystal from being disposed outside a microcavity.

An exemplary embodiment of the invention provides a display device, including: a substrate; a pixel electrode on the substrate; a roof layer on the pixel electrode and spaced apart from the pixel electrode; a plurality of microcavities defined between the pixel electrode and the roof layer, each of which includes a first edge opposite to a second edge thereof; a light blocking member between two adjacent microcavities of the plurality of microcavities, overlapping the first edge of one microcavity of the two microcavities, and not overlapping the second edge of the other microcavity; an injection hole exposing an inner area of a microcavity; a liquid crystal layer in the microcavity; and an encapsulation layer on the roof layer, which covers the injection hole and seals the microcavity.

The light blocking member may be on the pixel electrode.

The display device may further include: a first alignment layer on the pixel electrode; a second alignment layer below the roof layer; and an alignment material column connecting the first alignment layer and the second alignment layer to each other.

The display device may further include: a first injection hole at a side of the first edge of the microcavity, and a second injection hole at a side of the second edge of the microcavity.

The alignment material column may be adjacent to the second injection hole.

The light blocking member may overlap the first injection hole.

The light blocking member may not overlap the second injection hole.

The light blocking member may be spaced apart from the alignment material column.

The light blocking member may include a material having higher surface energy than that of the pixel electrode.

The display device may further include a first insulating layer below the pixel electrode and the light blocking member.

The light blocking member may include a material having higher surface energy than that of the first insulating layer.

The plurality of microcavities may be in a matrix form.

The two adjacent microcavities may be vertically adjacent to each other.

The display device may further include a thin film transistor connected with the pixel electrode, and between the two adjacent microcavities.

The light blocking member may overlap the thin film transistor.

The display device may further include a common electrode below the roof layer.

As described above, one or more exemplary embodiment of the display device according to the invention has the following effect.

According to one or more exemplary embodiment of the invention, it is possible to reduce a weight, a thickness, cost and a process time by manufacturing the display device by using only one substrate upon which elements or layers are disposed thereon.

Further, it is possible to reduce or effectively prevent a liquid crystal from remaining outside a microcavity, by asymmetrically disposing a light blocking member between adjacent microcavities.

BRIEF DESCRIPTION OF THE DRAWINGS

The above and other advantages and features of this disclosure will become more apparent by describing in further detail exemplary embodiments thereof with reference to the accompanying drawings, in which.

DETAILED DESCRIPTION

Figure 1:
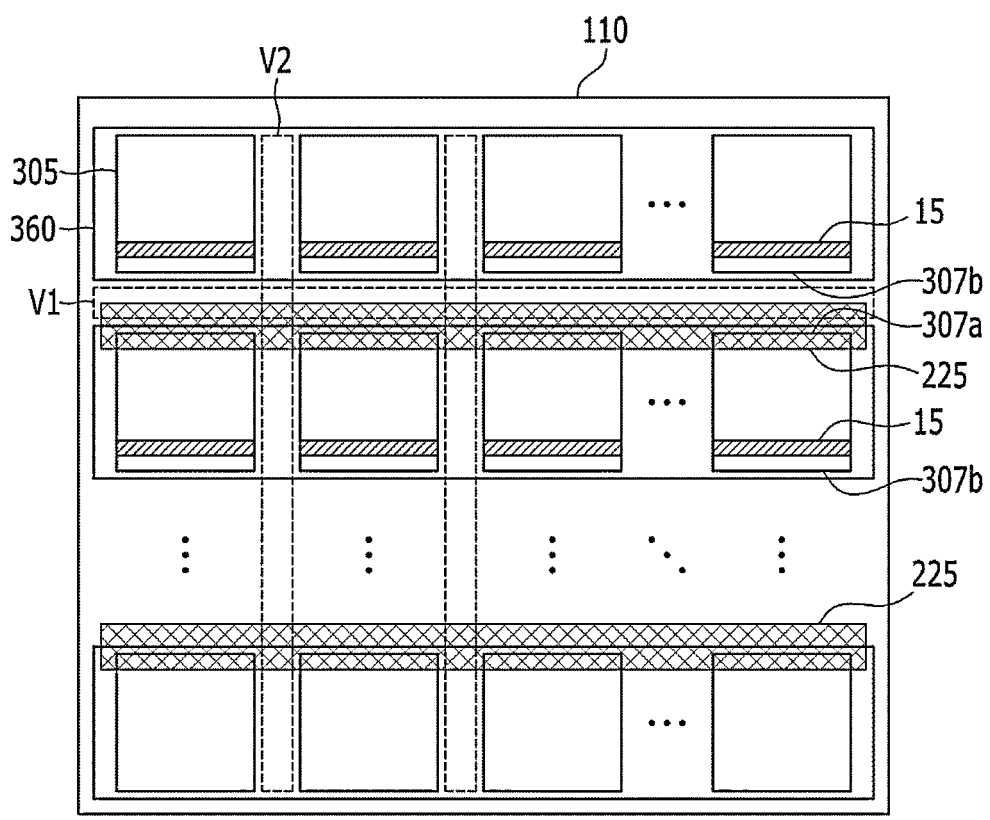
FIG. 1 is a plan view illustrating an exemplary embodiment of a display device according to the invention.

The invention will be described more fully hereinafter with reference to the accompanying drawings, in which exemplary embodiments of the invention are shown. As those skilled in the art would realize, the described exemplary embodiments may be modified in various different ways, all without departing from the spirit or scope of the invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Spatially relative terms, such as "below," "lower," "under," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention will be described in detail with reference to the accompanying drawings.

First, a display device according to the invention will be schematically described below with reference to FIG. 1.

FIG. 1 is a plan view illustrating an exemplary embodiment of a display device according to the invention.

The display device includes a substrate 110 including a material such as glass or plastic.

A microcavity 305, covered by a roof layer 360, is disposed on the substrate 110. The roof layer 360 extends to be elongated in a first or row (or horizontal) direction, and a plurality of microcavities 305 is disposed below one roof layer 360.

The microcavities 305 may be disposed in a matrix form in the plan view, first valleys V1 are positioned between the microcavities 305 adjacent to each other in a second or column (or vertical) direction, and second valleys V2 are positioned between the microcavities 305 adjacent to each other in the horizontal direction.

The plurality of roof layers 360 is separated from each other with the first valleys V1 therebetween. A portion of the microcavity 305 may not be covered by the roof layer 360, but may be exposed outside at a portion contacting the first valley V1. This exposed portion of the microcavity 305 may otherwise be referred to as injection holes 307a and 307b.

The injection holes 307a and 307b are disposed at both of opposing edges of a single microcavity 305. The injection holes 307a and 307b are configured by a first injection hole 307a and a second injection hole 307b. The first injection hole 307a is disposed to expose a side of a first edge of a single microcavity 305, and the second injection hole 307b is disposed to expose a side of a second edge of the same single microcavity 305. The side of the first edge and the side of the second edge of the same single microcavity 305 face each other.

Each roof layer 360 is disposed to be separated from the substrate 110 in a cross-sectional view at positions between adjacent second valleys V2, to form the microcavity 305. Further, each roof layer 360 is formed to be attached to the substrate 110 at the second valley V2 to cover both sides of the microcavity 305. That is, the roof layer 360 is disposed to cover a remainder of sides of the microcavity 305 except for the sides of the first edge and the second edge thereof in which the injection holes 307a and 307b are defined.

An alignment material column 15 having a shape in which alignment materials thereof are aggregated, is disposed inside the microcavity 305. The alignment material column 15 is disposed at one edge of the microcavity 305, and disposed to be adjacent to the second injection hole 307b of the microcavity 305. At least a part of the second injection hole 307b is blocked by the alignment material column 15. However, the invention is not limited thereto, and the alignment material column 15 may be disposed to be adjacent to the first injection hole 307a. That is, the alignment material column 15 may be disposed to be adjacent to any one of the two injection holes 307a and 307b exposing an inner area of the microcavity 305.

A first light blocking member 225 is disposed between the two adjacent microcavities 305. The first light blocking member 225 is disposed at the first valley V1 positioned between two vertically adjacent microcavities 305. The first light blocking member 225 overlaps a first edge of one microcavity 305 of the two adjacent microcavities 305, but does not overlap a second edge of the other microcavity 305 among the two adjacent microcavities 305. As illustrated in the drawings, the first light blocking member 225 may overlap an upper edge of the microcavity 305 positioned below the first valley V1, but may not overlap a lower edge of the microcavity 305 positioned above the first valley V1.

That is, the first light blocking member 225 is asymmetrically disposed to be closer to one microcavity 305 of the two vertically adjacent microcavities 305. In the exemplary embodiment of the invention, among a pair of vertically adjacent microcavities 305, when the alignment material column 15 is formed to be adjacent to the second injection hole 307b, the first light blocking member 225 does not overlap the second injection hole 307b, but overlaps the first injection hole 307a. In an alternative exemplary embodiment, among a pair of vertically adjacent microcavities 305, when the alignment material column 15 is disposed to be adjacent to the first injection hole 307a, the first light blocking member 225 does not overlap the first injection hole 307a, but overlaps the second injection hole 307b.

The structure of the illustrated exemplary embodiment of the display device according to the invention described above is just exemplified, and may be variously modified. In an exemplary embodiment, for example, in a plan view of the microcavities 305, the first valleys V1, and the second valleys V2 may be modified, and the plurality of roof layers 360 may be connected to each other (e.g., continuous) along the first valleys V1, and a part of each roof layer 360 is separated from the substrate 110 in a cross-sectional view at the second valley V2 and thus the adjacent microcavities 305 may be connected to each other.

Hereinafter, one pixel of the display device according to the invention will be schematically described below with reference to FIG. 2.

Figure 2:
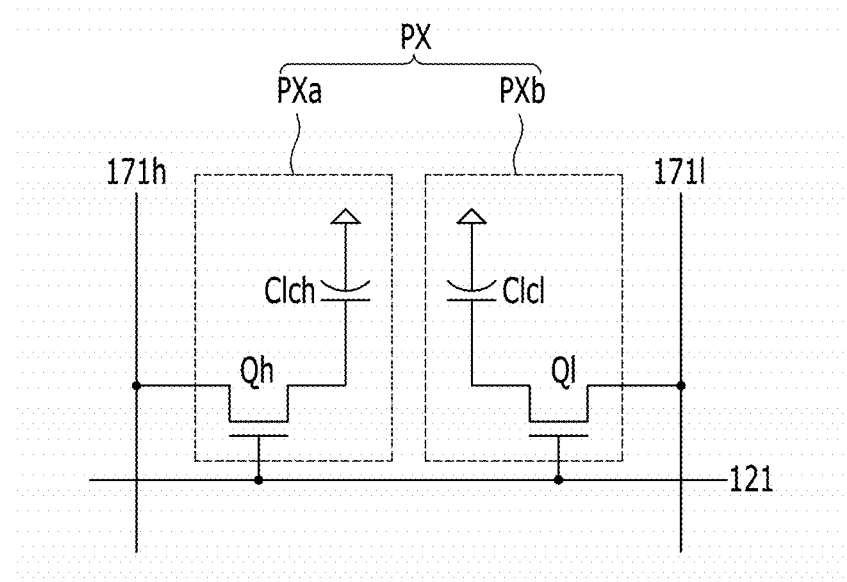
FIG. 2 is an equivalent circuit diagram of an exemplary embodiment of one pixel of a display device according to the invention.

FIG. 2 is an equivalent circuit diagram of an exemplary embodiment of one pixel of the display device according to the invention.

The display device includes a plurality of signal lines 121, 171h and 171l, and a plurality of pixels PX connected thereto. In a plan view of the display device, the plurality of pixels PX may be disposed in a matrix form which includes a plurality of pixel rows and a plurality of pixel columns.

Each pixel PX may include a first subpixel PXa and a second subpixel PXb. The first subpixel PXa and the second subpixel PXb may be vertically disposed in the plan view of the display device. In the vertically disposed arrangement, the first valley V1 may be positioned between the first subpixel PXa and the second subpixel PXb to be elongated in a pixel row direction, and a second valley V2 may be positioned between the plurality of pixel columns and elongated in a pixel column direction.

The signal lines 121, 171h and 171l include a gate line 121 configured to transfer a gate signal, and a first data line 171h and a second data line 171l configured to transfer different data voltages.

In the one pixel PX, a first switching element Qh connected to the gate line 121 and the first data line 171h is disposed, and a second switching element Ql connected to the gate line 121 and the second data line 171l is disposed.

In the first subpixel PXa, a first liquid crystal capacitor Clch connected to the first switching element Qh is disposed, and in the second subpixel PXb, a second liquid crystal capacitor Clcl connected to the second switching element Ql is disposed.

A first terminal of the first switching element Qh is connected to the gate line 121, a second terminal is connected to the first data line 171h, and a third terminal is connected to the first liquid crystal capacitor Clch.

A first terminal of the second switching element Ql is connected to the gate line 121, a second terminal is connected to the second data line 171l, and a third terminal is connected to the second liquid crystal capacitor Clcl.

In an exemplary embodiment of an operation of a liquid crystal display according to the invention, when a gate-on voltage is applied to the gate line 121, the first switching element Qh and the second switching element Ql connected thereto are turned on, and the first and second liquid crystal capacitors Clch and Clcl are charged by different data voltages transferred through the first and second data lines 171h and 171l, respectively. The data voltage transferred by the second data line 171l is lower than the data voltage transferred by the first data line 171h. Accordingly, the second liquid crystal capacitor Clcl is charged at a voltage lower than the first liquid crystal capacitor Clch, thereby improving side visibility.

Hereinafter, a further structure of one pixel of a liquid crystal display according to the invention will be described with reference to FIGS. 3 to 5.

Figure 3:
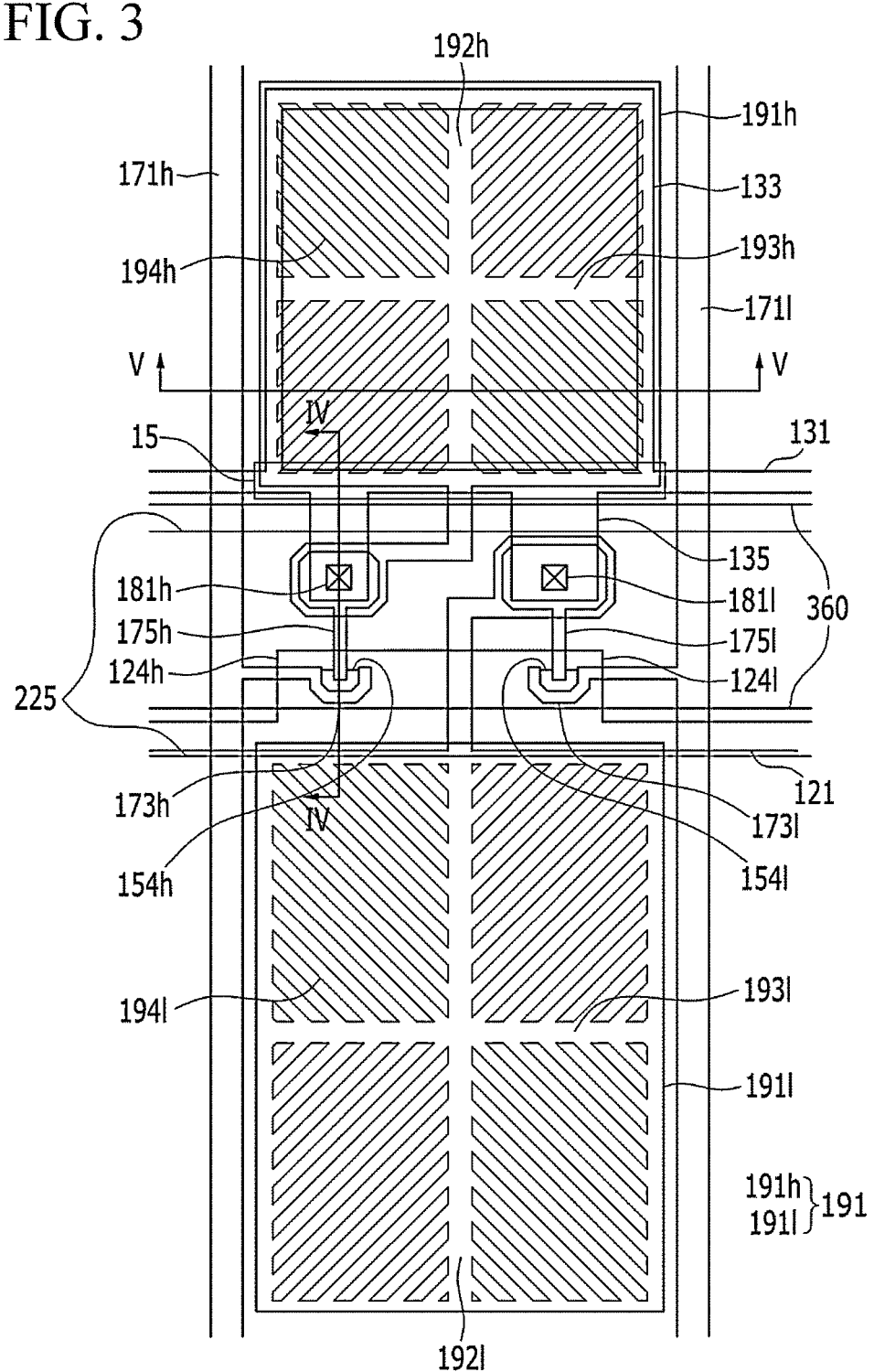
FIG. 3 is a plan view illustrating an exemplary embodiment of one pixel of a display device according to the invention.
Figure 4:
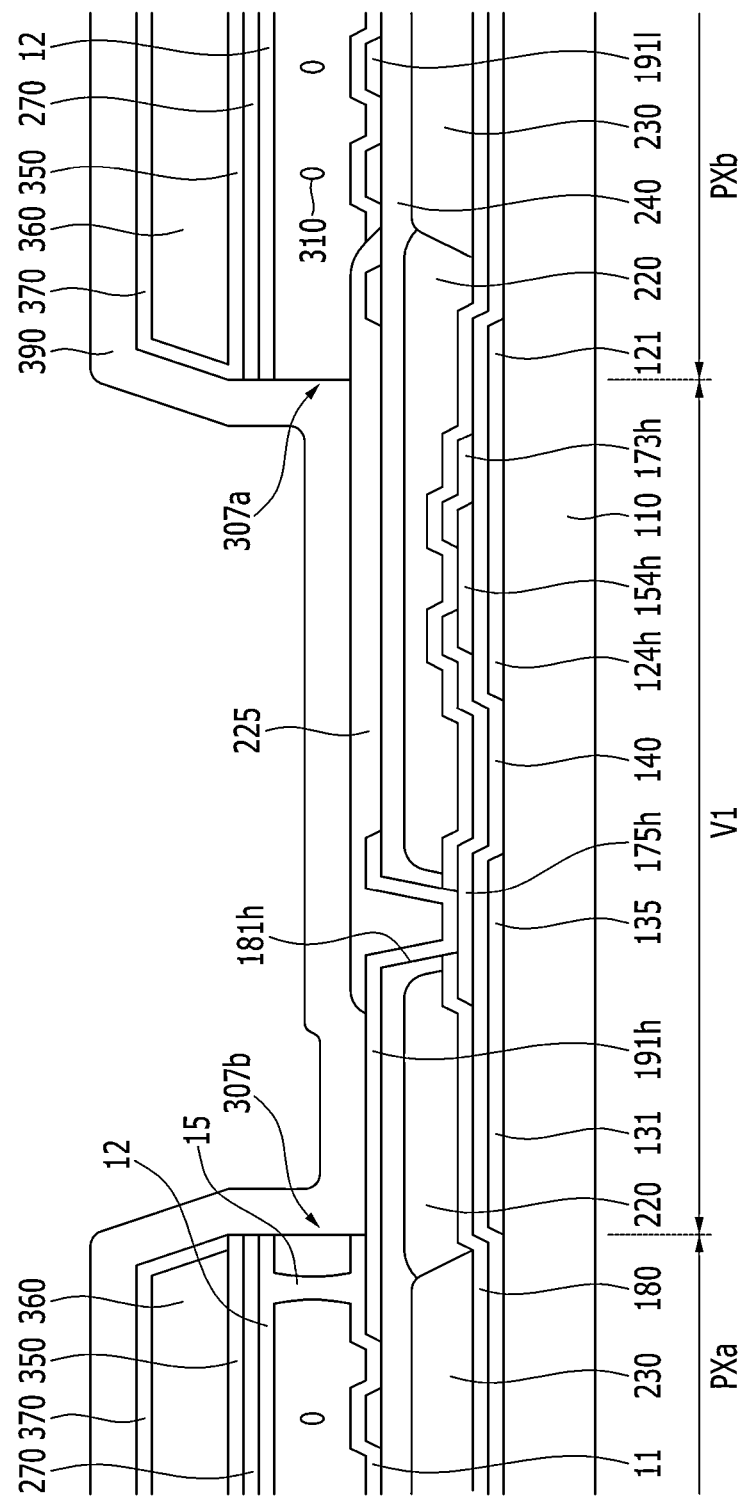
FIG. 4 is a cross-sectional view illustrating the display device taken along line IV-IV of FIG. 3 according to the invention.
Figure 5:
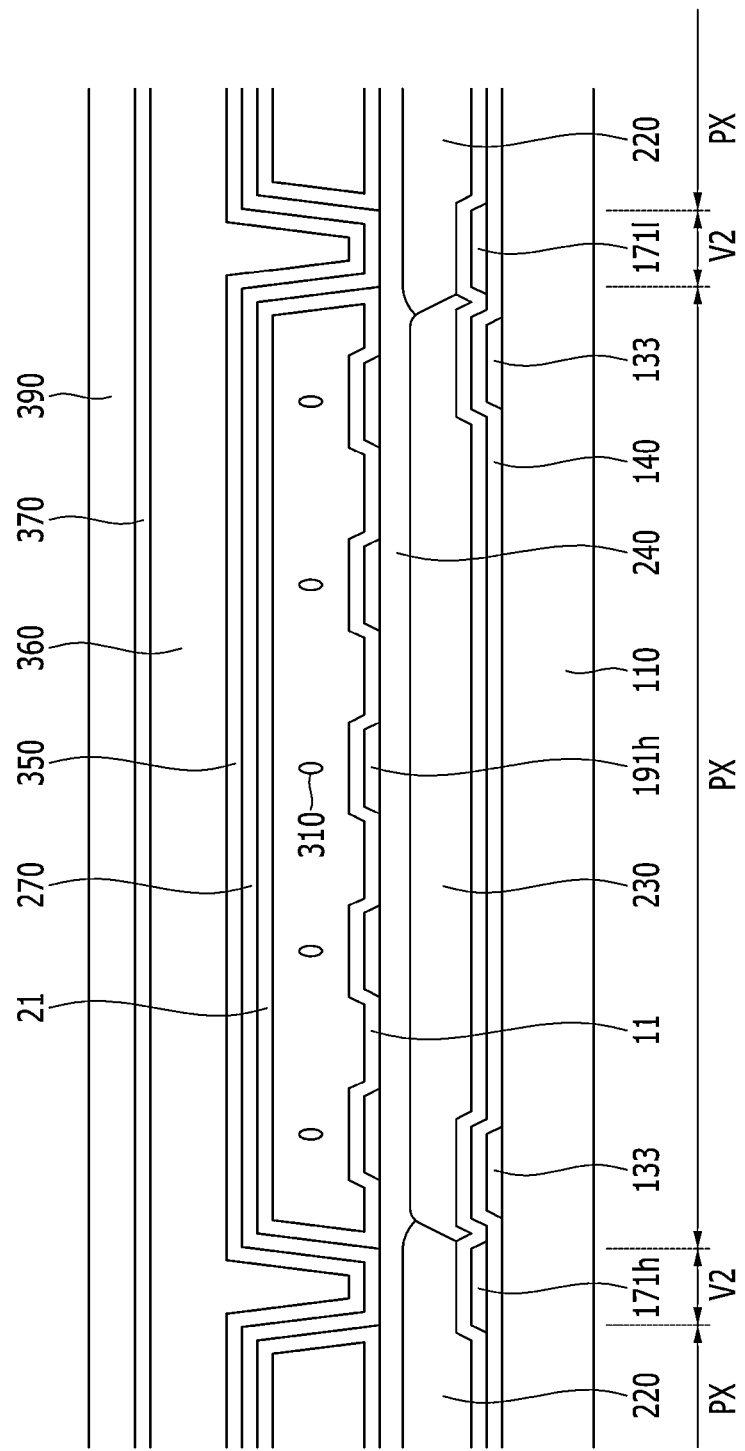
FIG. 5 is a cross-sectional view illustrating the display device taken along line V-V of FIG. 3 according to the invention.

FIG. 3 is a plan view illustrating an exemplary embodiment of one pixel of a display device according to the invention, FIG. 4 is a cross-sectional view illustrating the display device taken along line IV-IV in FIG. 3 according to the invention, and FIG. 5 is a cross-sectional view illustrating the display device taken along line V-V in FIG. 3 according to the invention.

Referring to FIGS. 3 to 5, on the substrate 110, a gate line 121, and a first gate electrode 124h and a second gate electrode 124l which protrude from the gate line 121, are disposed.

The gate line 121 extends to be elongated mainly in a horizontal direction and is configured to transfer a gate signal. The first gate electrode 124h and the second gate electrode 124l protrude above the gate line 121 in the plan view. The first gate electrode 124h and the second gate electrode 124l are connected with each other to form one single, continuous protrusion protruding above the gate line 121. However, the invention is not limited thereto, and the protruding form of the first gate electrode 124h and the second gate electrode 124l may be variously modified.

A storage electrode line 131, and storage electrodes 133 and 135 protruding from the storage electrode line 131, may be further disposed on the substrate 110.

The storage electrode line 131 extends to be elongated in the same direction as the gate line 121, and is disposed to be spaced apart from the gate line 121 in the vertical direction. A predetermined voltage may be applied to the storage electrode line 131. The storage electrode 133 protruding above the storage electrode line 131 is disposed to surround an edge of the first subpixel PXa (refer to FIG. 2). The storage electrode 135 protrudes below the storage electrode line 131 in the plan view and is disposed to be adjacent to the first gate electrode 124h and the second gate electrode 124l.

A gate insulating layer 140 is disposed on the gate line 121, the first gate electrode 124h, the second gate electrode 124l, the storage electrode line 131, and the storage electrodes 133 and 135. The gate insulating layer 140 may include an inorganic insulating material such as silicon nitride (SiNx) and silicon oxide (SiOx). Further, the gate insulating layer 140 may be a single layer or a multiple layer structure.

A first semiconductor 154h and a second semiconductor 154l are disposed on the gate insulating layer 140. The first semiconductor 154h may be positioned on the first gate electrode 124h, and the second semiconductor 154l may be positioned on the second gate electrode 124l. The first semiconductor 154h may be disposed below the first data line 171h in the cross-sectional view, and the second semiconductor 154l may be disposed below the second data line 171l in the cross-sectional view. The first semiconductor 154h and the second semiconductor 154l may include amorphous silicon, polycrystalline silicon, metal oxide and the like.

An ohmic contact (not illustrated) may be further disposed on each of the first semiconductor 154h and the second semiconductor 154l. The ohmic contact may include silicide or a material such as n+ hydrogenated amorphous silicon in which n-type impurity is doped at a relatively high concentration.

On the first semiconductor 154h, the second semiconductor 154l and the gate insulating layer 140, the first data line 171h, the second data line 171l, the first source electrode 173h, the first drain electrode 175h, the second source electrode 173l and the second drain electrode 175l are disposed.

The first data line 171h and the second data line 171l transfer data signals and mainly extend to be elongated in a vertical direction to cross the gate line 121 and the storage electrode line 131. The first data line 171h and the second data line 171l transfer different data voltages. The data voltage transferred by the second data line 171l is lower than the data voltage transferred by the first data line 171h.

The first source electrode 173h protrudes from the first data line 171h, and is disposed above the first gate electrode 124h in the cross-sectional view. The second source electrode 173l protrudes from the second data line 171l, and is disposed above the second gate electrode 124l in a cross-sectional view. Each of the first drain electrode 175h and the second drain electrode 175l includes a relatively wide first end portion and a rod-shaped second end portion. The wide first end portions of the first drain electrode 175h and the second drain electrode 175l overlap the storage electrode 135 protruding below the storage electrode line 131. The rod-shaped second end portions of the first drain electrode 175h and the second drain electrode 175l are partially surrounded by the first source electrode 173h and the second source electrode 173l, respectively.

The first and second gate electrodes 124h and 124l, the first and second source electrodes 173h and 173l, and the first and second drain electrodes 175h and 175l form first and second thin film transistors (TFTs) Qh and Ql together with the first and second semiconductors 154h and 154l, respectively. A channel of the thin film transistors is formed in each of the semiconductors 154h and 154l exposed between each of the source electrodes 173h and 173l and each of the drain electrodes 175h and 175l, respectively.

A passivation layer 180 is disposed on the first data line 171h, the second data line 171l, the first source electrode 173h, the first drain electrode 175h, the first semiconductor 154h exposed between the first source electrode 173h and the first drain electrode 175h, the second source electrode 173l, the second drain electrode 175l, and the second semiconductor 154l exposed between the second source electrode 173l and the second drain electrode 175l. The passivation layer 180 may include an organic insulating material or an inorganic insulating material, and may be a single layer or a multiple layer structure.

A color filter 230 in each pixel PX is disposed on the passivation layer 180. Each color filter 230 may display one of primary colors such as three primary colors of red, green and blue. The color filter 230 is not limited to the three primary colors of red, green and blue, but may display cyan, magenta, yellow and white-based colors.

A second light blocking member 220 may be disposed in a region between adjacent color filters 230. The second light blocking member 220 is disposed on a boundary of the pixel PX and the thin film transistor to reduce or effectively prevent light leakage. That is, the second light blocking member 220 may be disposed at the first valley V1 and/or the second valley V2.

A first insulating layer 240 may be further disposed on the color filter 230 and the second light blocking member 220. The first insulating layer 240 may include an organic insulating material, and may serve to planarize the color filter 230 and the second light blocking member 220. The first insulating layer 240 may have a structure where layers of an organic insulating material and layers of an inorganic insulating material are alternated and/or laminated, and in an alternative exemplary embodiment, may be omitted.

In the passivation layer 180 and the first insulating layer 240, a first contact hole 181h exposing the wide second end portion of the first drain electrode 175h is defined, and a second contact hole 181l exposing the wide second end portion of the second drain electrode 175l is defined.

A pixel electrode 191 is disposed on the first insulating layer 240. The pixel electrode 191 may include a transparent metal material such as indium tin oxide ("ITO") and indium zinc oxide ("IZO").

The pixel electrode 191 includes a first subpixel electrode 191h and a second subpixel electrode 191l which are separated from each other with the gate line 121 and the storage electrode line 131 therebetween, and disposed in an upper area and a lower area of the pixel PX based on the gate line 121 and the storage electrode line 131, to be adjacent to each other in the column direction. That is, the first subpixel electrode 191h and the second subpixel electrode 191l are separated from each other with the first valley V1 therebetween, the first subpixel electrode 191h is positioned in the first subpixel PXa, and the second subpixel electrode 191l is positioned in the second subpixel PXb.

The first subpixel electrode 191h is connected with the first drain electrode 175h via the first contact hole 181h, and the second subpixel electrode 191l is connected to the second drain electrode 175l via the second contact hole 181l. Accordingly, when the first thin film transistor Qh of the first subpixel PXa and the second thin film transistor Ql of the second subpixel PXb (refer to FIG. 2) are turned on, the first subpixel electrode 191h and the second subpixel electrode 191l receive different data voltages from the first drain electrode 175h and the second drain electrode 175l. An electric field may be generated between the pixel electrode 191 and a common electrode 270.

An overall shape of each of the subpixel electrode 191h and the second subpixel electrode 191l is a quadrangle. The subpixel electrode 191h and the second subpixel electrode 191l each include a cross stem. The cross stems includes horizontal stems 193h and 193l and vertical stems 192h and 192l crossing the horizontal stems 193h and 193l, respectively. Further, each of the first subpixel electrode 191h and the second subpixel electrode 191l includes a plurality of minute branches 194h and 194l, respectively.

Each subpixel electrode 191h and 191l is divided into four subregions by the horizontal stems 193h and 193l and the vertical stems 192h and 192l, respectively. The minute branches 194h and 194l obliquely extend from the horizontal stems 193h and 193l and the vertical stems 192h and 192l, and the extending direction may form an angle of approximately 45 degrees or 135 degrees with the gate line 121 or the horizontal stems 193h and 193l. Further, directions in which the minute branches 194h and 194l of two adjacent subregions extend may be perpendicular to each other, but the invention is not limited thereto.

In the exemplary embodiment, the first subpixel electrode 191h and the second subpixel electrode 191l may further include outer stems surrounding outsides of the first subpixel PXa and the second subpixel PXb, respectively. Referring to FIG. 3, the outer stems are disposed at distal ends of the minute branches 194h and 194l, respectively The plan view configuration of the pixel PX, the structure of the thin film transistor, and the shape of the pixel electrode described above are just exemplified, and the invention is not limited thereto and may be variously modified.

The first light blocking member 225 is disposed on the pixel electrode 191 and the first insulating layer 240. The first light blocking member 225 is disposed at the first valley V1 as described above, and disposed asymmetrically with respect to vertically adjacent microcavities 305 to be closer to one microcavity 305. The thin film transistors Qh and Ql are positioned at the first valley V1, and the first light blocking member 225 overlaps the thin film transistors Qh and Ql. Particularly, the first light blocking member 225 is disposed to cover and overlap the first contact hole 181h and the second contact hole 181l which are defined for connection of the thin film transistors Qh and Ql and the pixel electrode 191, to reduce or effectively prevent light leakage.

The first light blocking member 225 disposed on (e.g., above) the first insulating layer 240 and the second light blocking member 220 disposed below the first insulating layer 240 may include the same material, or in an alternative exemplary embodiment, may include different materials. Particularly, the first light blocking member 225 disposed above the first insulating layer 240 may include a material having surface energy higher than that of the pixel electrode 191. Further, the first light blocking member 225 may include a material having surface energy higher than that of the first insulating layer 240.

The common electrode 270 is disposed on the pixel electrode 191 so as to be spaced apart from the pixel electrode 191 at a predetermined distance. The microcavity 305 is defined between the pixel electrode 191 and the common electrode 270. That is, the microcavity 305 is surrounded by the pixel electrode 191 and the common electrode 270. A width and an area of the microcavity 305 may be variously modified according to a size and resolution of the display device. However, the invention is not limited thereto, and in an alternative exemplary embodiment the common electrode 270 and the pixel electrode 191 may be disposed with an insulating layer therebetween. In this alternative exemplary embodiment, the microcavity 305 is not defined between the pixel electrode 191 and the common electrode 270, but the microcavity 305 may be defined on (e.g., above) the common electrode 270.

The common electrode 270 may include a transparent metal material such as ITO and IZO. A predetermined voltage may be applied to the common electrode 270, and an electric field may be generated between the pixel electrode 191 and the common electrode 270. A first alignment layer 11 is disposed on the pixel electrode 191. The first alignment layer 11 may also be disposed directly on or contact the first insulating layer 240 which is not covered and exposed by portions of the pixel electrode 191.

A second alignment layer 21 is disposed below the common electrode 270 to face the first alignment layer 11.

The first alignment layer 11 and the second alignment layer 21 may be vertical alignment layers, and include an alignment material such as polyamic acid, polysiloxane and polyimide. The first and second alignment layers 11 and 21 may be connected to each other at a side wall of the edge of the microcavity 305 via an alignment material column 15. The first alignment layer 11, the second alignment layer 21 and the alignment material column 15 may collectively form a single, unitary, continuous member.

Further, in an exemplary embodiment of manufacturing a display device, the alignment material column 15 connecting the first alignment layer 11 and the second alignment layer 21 is formed. The alignment material column 15 is formed when a solid component is pushed to one edge during a process of curing the alignment material, by injection of an alignment material into the microcavity 305 for forming the first alignment layer 11 and the second alignment layer 21. When the alignment material is injected through the first injection hole 307a, the alignment material column 15 is formed to be adjacent to the second injection hole 307b opposite to the first injection hole 307a. On the other hand, when the alignment material is injected through the second injection hole 307b, the alignment material column 15 is formed to be adjacent to the first injection hole 307a.

A liquid crystal layer including liquid crystal molecules 310 is disposed in the microcavity 305 positioned between the pixel electrode 191 and the common electrode 270. The liquid crystal molecules 310 may have negative dielectric anisotropy, and may be extended with a long axis thereof in a vertical (e.g., perpendicular) direction to the substrate 110 while the electric field is not applied. That is, vertical alignment may be performed.

The first subpixel electrode 191h and the second subpixel electrode 191l to which the data voltages are applied, generate an electric field together with the common electrode 270, to determine directions of the liquid crystal molecules 310 positioned in the microcavity 305 between the two electrodes 191 and 270. Luminance of light passing through the liquid crystal layer varies according to the determined directions of the liquid crystal molecules 310.

A second insulating layer 350 may be further disposed on the common electrode 270. The second insulating layer 350 may include an inorganic insulating material such as silicon nitride (SiNx) and silicon oxide (SiOx), and in an alternative exemplary embodiment may be omitted.

The roof layer 360 is disposed on the second insulating layer 350. The roof layer 360 may include an organic material. The microcavity 305 is defined below the roof layer 360. In an exemplary embodiment of manufacturing a display device, the roof layer 360 is hardened by a curing process to maintain the shape of the microcavity 305. That is, the roof layer 360 is formed to be spaced apart from the pixel electrode 191, with the microcavity 305 defined therebetween.

A single roof layer 360 is disposed to be extended and overlap each pixel PX and each second valley V2 along a pixel row, and is not disposed at the first valley V1 between adjacent pixel rows. That is, the roof layer 360 is not disposed between the first subpixel PXa and the second subpixel PXb adjacent in the column direction. The microcavity 305 is defined below the roof layer 360, at each of a respective first subpixel PXa and second subpixel PXb. In the second valley V2, the microcavity 305 is not defined below the roof layer 360, and the roof layer 360 contacts the substrate 110.

Accordingly, a cross-sectional thickness of the roof layer 360 positioned at the second valley V2 may be larger than a cross-sectional thickness of the roof layer 360 positioned at each of the first subpixel PXa and the second subpixel PXb. The upper surface and both sides of the microcavity 305 are covered by and face portions of the roof layer 360.

Injection holes 307a and 307b exposing an inner area of the microcavity 305 are defined with the roof layer 360. The injection holes 307a and 307b include a first injection hole 307a exposing the side of the first edge of one microcavity 305 and a second injection hole 307b exposing the side of the second edge of the one microcavity 305. The first injection hole 307a of one microcavity 305 of two adjacent microcavities 305 and the second injection hole 307b of the other microcavity 305 of the two adjacent microcavities 305 face each other with the first valley V1 therebetween. Since an inner area of the microcavity 305 is exposed by the injection holes 307a and 307b, an aligning agent, a liquid crystal material or the like may be injected into the microcavity 305 via the injection holes 307a and 307b.

The first light blocking member 225 described above overlaps the injection holes 307a and 307b adjacent to which the alignment material column 15 is not disposed. That is, the first light blocking member 225 is spaced apart from the alignment material column 15, such as in the plan view. Referring to FIG. 4, the alignment material column 15 is illustrated adjacent to the second injection hole 307b. Further, the first light blocking member 225 overlaps the first injection hole 307a (to which the alignment material column 15 is not adjacent), but does not overlap the second injection hole 307b (to which the alignment material column 15 is adjacent).

A third insulating layer 370 may be further disposed on the roof layer 360. The third insulating layer 370 may include an inorganic insulating material such as silicon nitride (SiNx) and silicon oxide (SiOx). The third insulating layer 370 may cover and face an upper surface and a side of the roof layer 360. The third insulating layer 370 serves to protect the roof layer 360 including an organic material, and in an alternative exemplary embodiment may be omitted.

An encapsulation layer 390 may be disposed on the third insulating layer 370. The encapsulation layer 390 covers the injection holes 307a and 307b by which the inner area of the microcavity 305 is exposed outside thereof. That is, the encapsulation layer 390 may seal the microcavity 305 so that the liquid crystal molecules 310 disposed in the microcavity 305 are not discharged outside. Since the encapsulation layer 390 contacts the liquid crystal molecules 310, the encapsulation layer 390 may include a material which does not react with liquid crystal molecules 310. In an exemplary embodiment, for example, the encapsulation layer 390 may include parylene and the like.

The encapsulation layer 390 may have a multilayer structure such as having a double layer structure or a triple layer structure. The double layer structure may include two layers of different materials. The triple layer structure may include three layers, and materials of adjacent layers are different from each other. In an exemplary embodiment, for example, the encapsulation layer 390 may include a layer of an organic insulating material and a layer of an inorganic insulating material.

Although not illustrated, polarizers may be further disposed on upper and lower sides of the display device. The polarizers may include a first polarizer and a second polarizer. The first polarizer may be attached onto the lower side of the substrate 110, and the second polarizer may be attached onto the encapsulation layer 390.

Hereinafter, a principle in which the liquid crystal material is injected into the microcavity to be substantially omitted from the first valley will be described with reference to the drawings.

First, referring to FIGS. 6 to 8, the liquid crystal material dropped at the center of the first valley V1 will be described.

Figure 6:
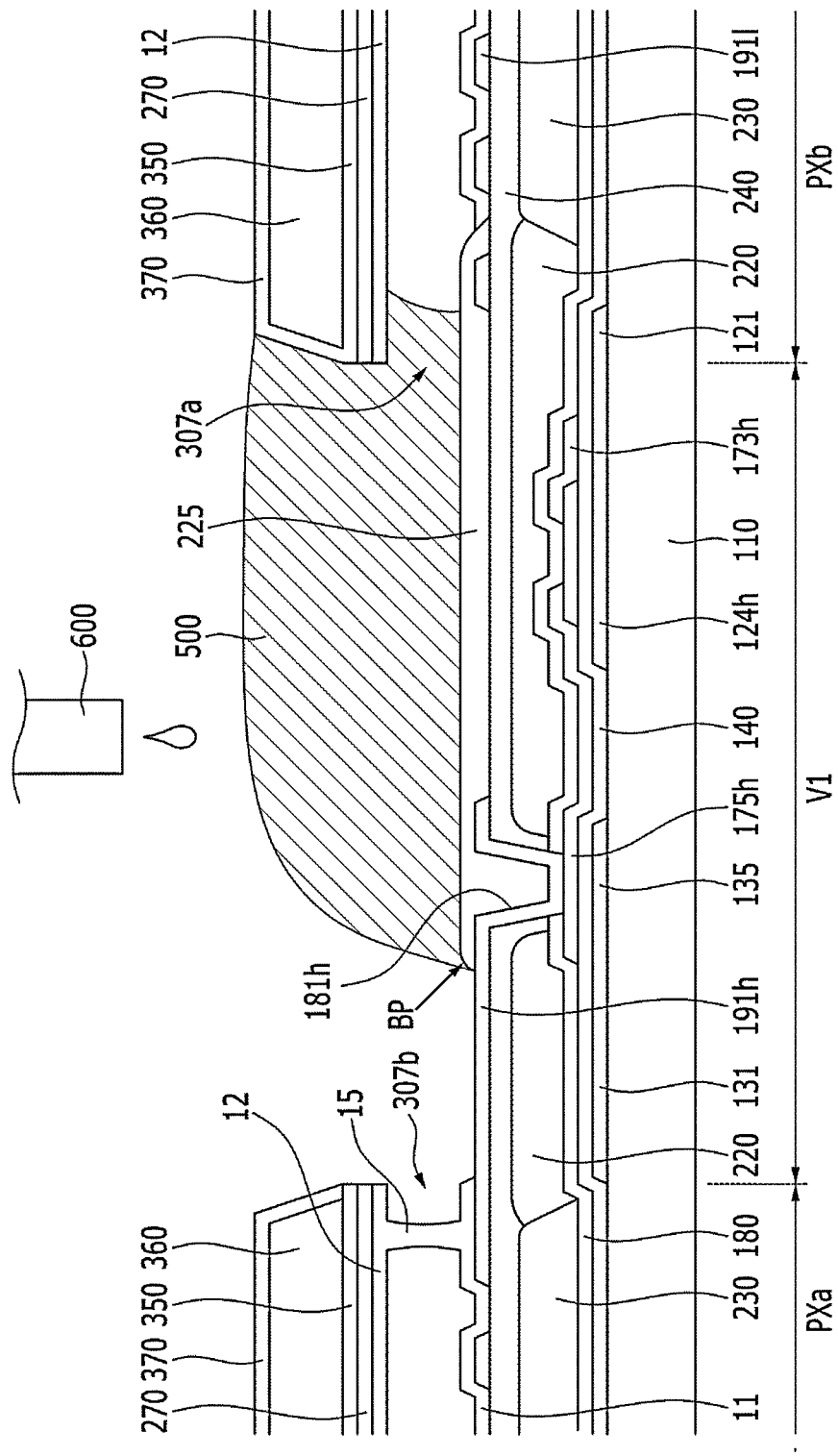
FIGS. 6 and 7 are cross-sectional views illustrating an exemplary embodiment of a process in which a liquid crystal material is injected into a microcavity of a display device.
Figure 7:
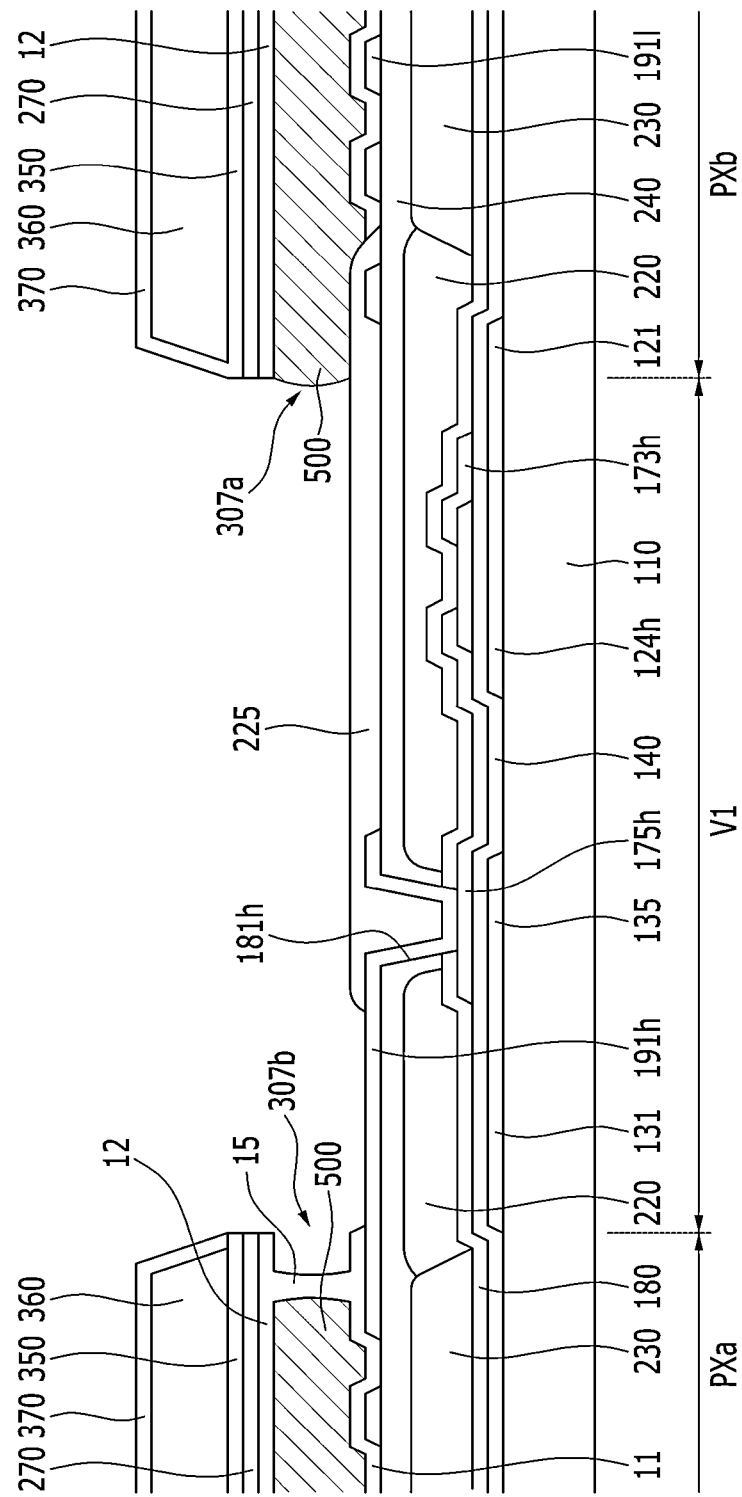
Figure 8:
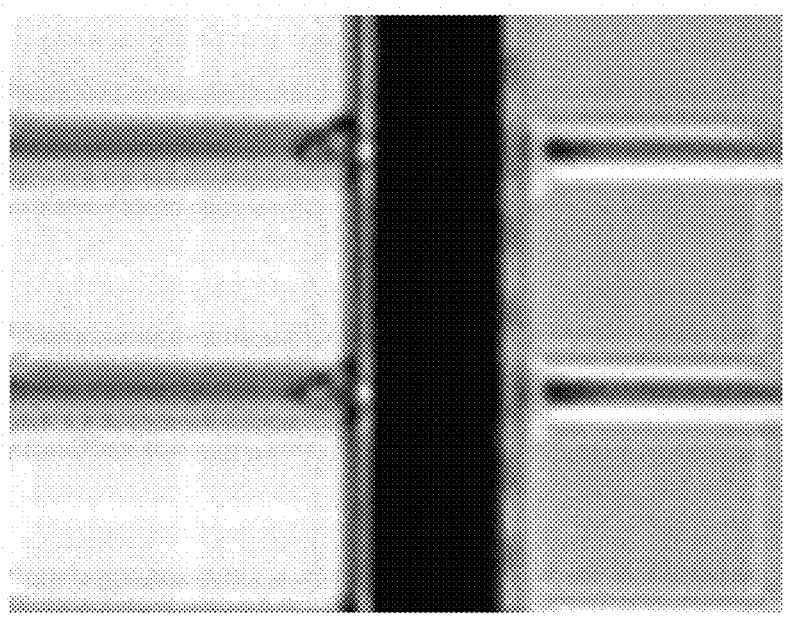
FIG. 8 is a diagram illustrating an exemplary embodiment of a part of a display device according to the invention.

FIGS. 6 and 7 are process cross-sectional views illustrating an exemplary embodiment of a process in which a liquid crystal material is injected into a microcavity of a display device, and FIG. 8 is a diagram illustrating a part of the display device formed in FIGS. 6 and 7, according to the invention.

As illustrated in FIG. 6, after the roof layer 360 is formed, a nozzle 600 is positioned at a center with respect to two adjacent microcavities 305, before the encapsulation layer 390 is formed.

A liquid crystal material 500 is dropped on the substrate 110 via the nozzle 600. The liquid crystal material 500 first meets the first light blocking member 225. The first light blocking member 225 does not overlap the second injection hole 307b with the alignment material column 15 adjacent thereto, but overlaps the first injection hole 307a without the alignment material column 15 adjacent thereto. The first light blocking member 225 is spaced apart from the alignment material column 15, and capillary force of an edge of the first light blocking member 225 facing the alignment material column 15 is larger than that of another portion of the first light blocking member 225 further from the edge thereof. Further, surface energy of the first light blocking member 225 is larger than that of the pixel electrode 191 and/or the first insulating layer 240. Accordingly, the edge of the first light blocking member 225 positioned in the first valley V1 becomes a break point BP. The liquid crystal material 500 does not flow over the break point BP and toward the alignment material column 15 due to the break point BP.

As illustrated in FIG. 7, the liquid crystal material 500 dropped in the first valley V1 is fully injected into the microcavity 305 through the first injection hole 307a. The liquid crystal material 500 is not left in the first valley V1 around the alignment material column 15.

With reference to FIG. 8, when the display device according to the invention is actually manufactured by the method described for FIG. 6 and FIG. 7, it can be seen that the liquid crystal material 500 does not remain in the first valley V1 even though the liquid crystal material 500 is dropped at the center with respect to two adjacent microcavities 305 (e.g., at the first valley V1).

Next, referring to FIGS. 9 to 12, a case where the liquid crystal material is dropped at the edge of the first valley V1 will be described.

Figure 9:
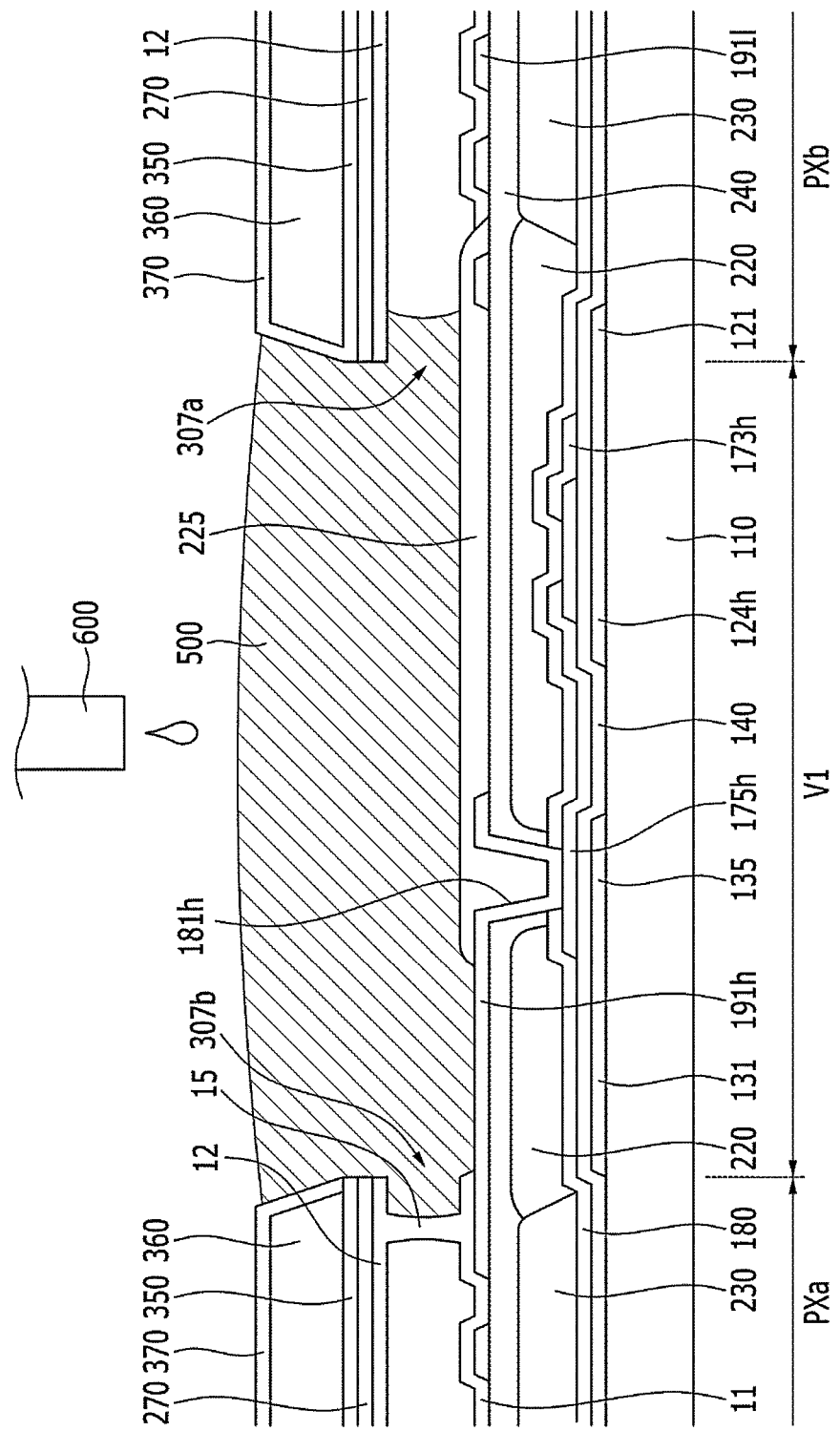
FIGS. 9 to 11 are process cross-sectional views illustrating another exemplary embodiment of a process in which a liquid crystal material is injected into a microcavity of a display device.
Figure 10:
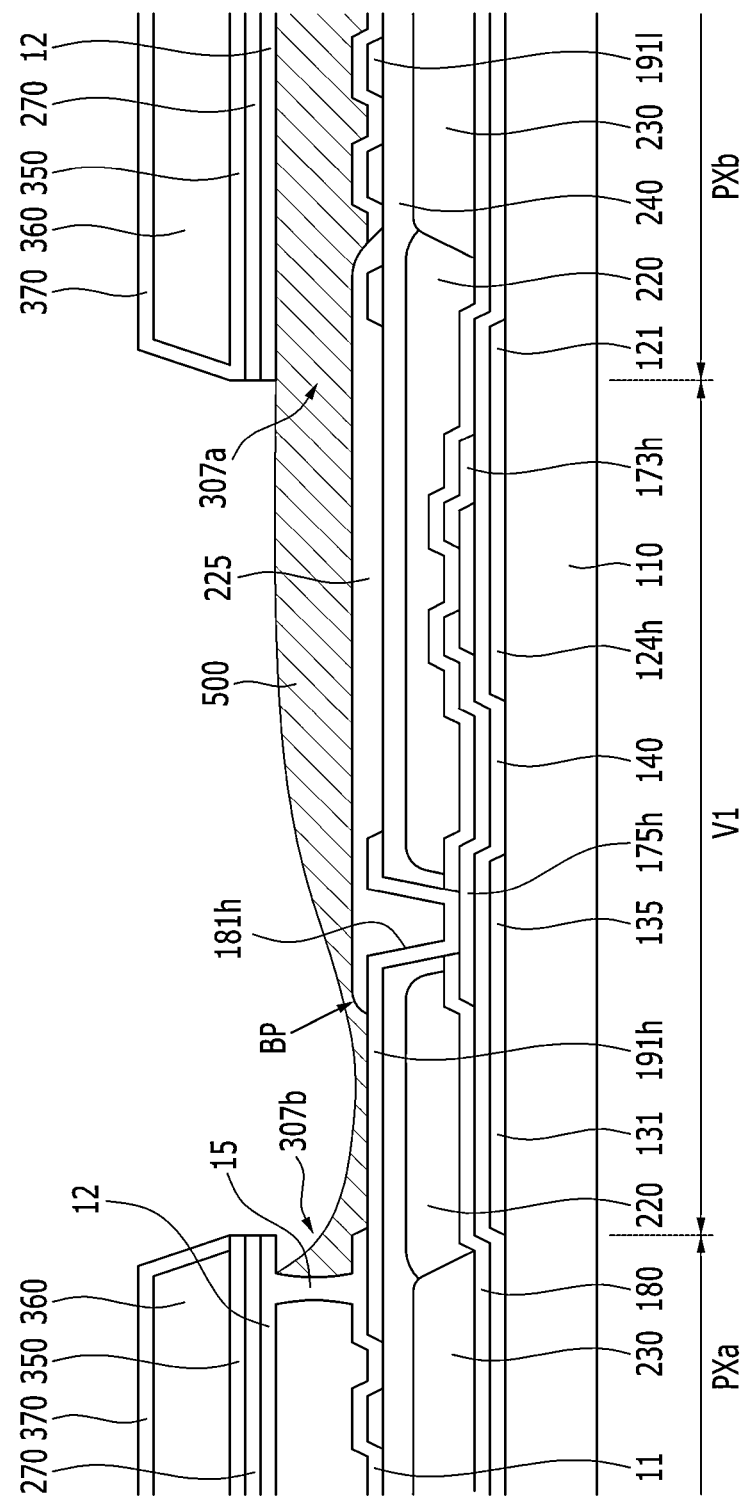
Figure 11:
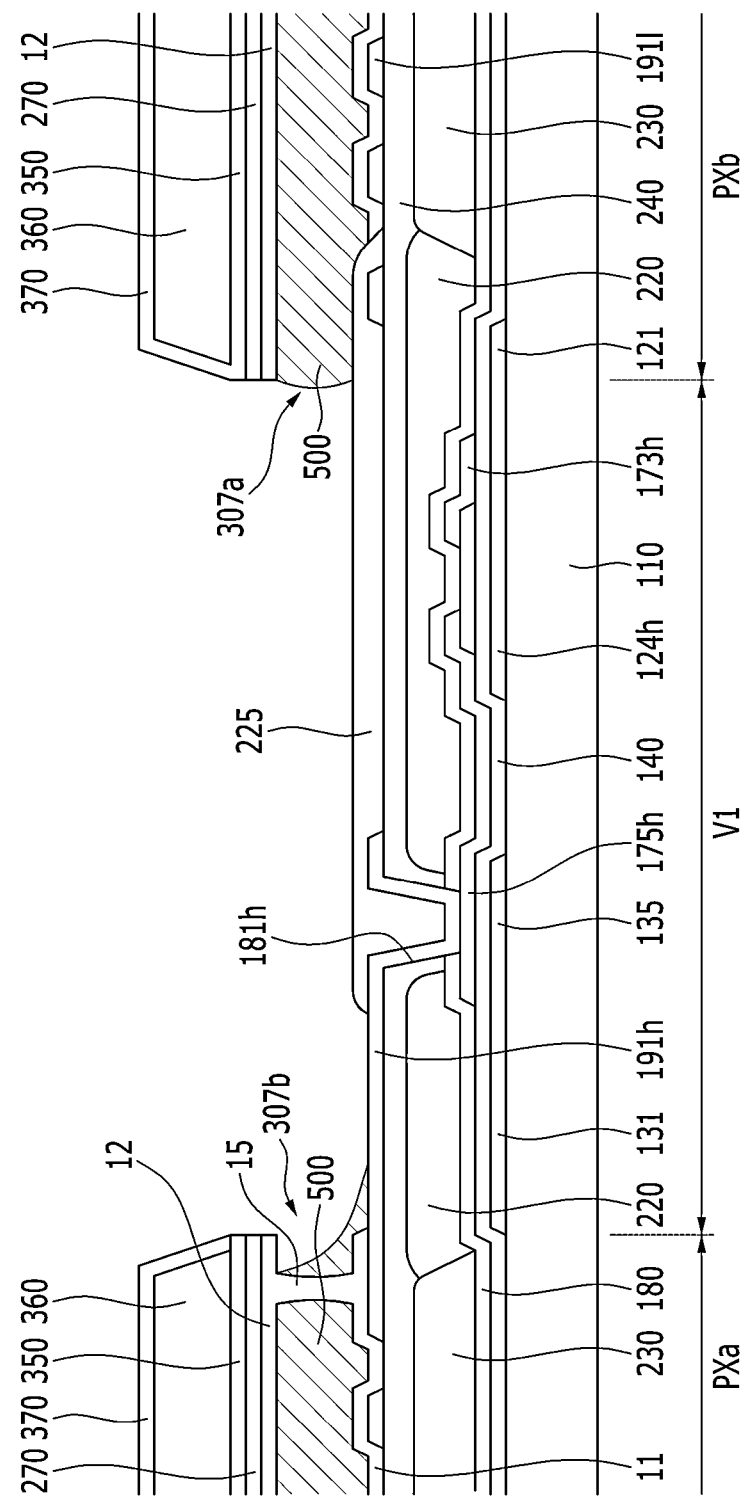
Figure 12:
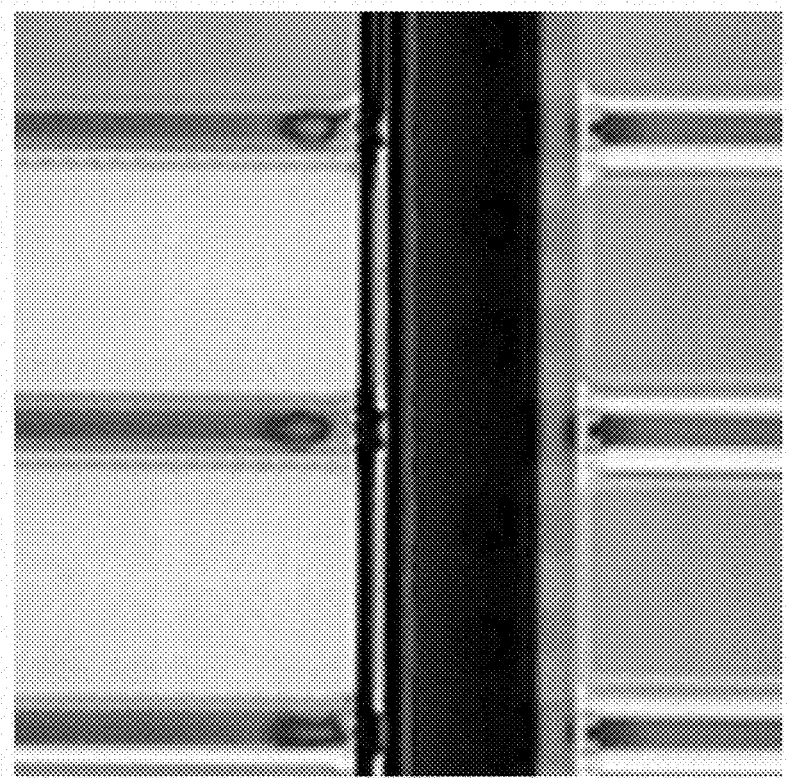
FIG. 12 is a diagram illustrating an exemplary embodiment of a part of the display device according to the invention.

FIGS. 9 to 11 are process cross-sectional views illustrating another exemplary embodiment of a process in which a liquid crystal material is injected into a microcavity of a display device, and FIG. 12 is a diagram illustrating a part of the display device formed in FIGS. 9 to 11 according to the invention.

As illustrated in FIG. 9, after the roof layer 360 is formed, a nozzle 600 is positioned between two adjacent microcavities 305 before the encapsulation layer 390 is formed. The nozzle 600 may be positioned at the center between the adjacent microcavities 305, but alternative may be positioned at an edge of one of adjacent microcavities 305 due to misalignment and the like.

Although not illustrated, when the nozzle 600 drops the liquid crystal material 500 near an edge of a microcavity 305 at a position adjacent to the first injection hole 307a without the alignment material column 15 adjacent thereto, the liquid crystal material 500 is not positioned near the alignment material column 15. Accordingly, the liquid crystal material 500 is injected into the microcavity 305 of which an inner area is exposed by the first injection hole 307a, and the liquid crystal material 500 does not remain in the first valley V1.

On the other hand, referring to FIG. 9, when the nozzle 600 drops the liquid crystal material 500 near an edge at a position adjacent to the second injection hole 307b with the alignment material column 15 adjacent thereto, the liquid crystal material 500 is uniformly positioned over the entire area of the first valley V1.

As illustrated in FIG. 10, the liquid crystal material 500 dropped in the first valley V1 is partially injected into the microcavity 305 through the first injection hole 307a. Since the second injection hole 307b is blocked by the alignment material column 15, the liquid crystal material 500 is not injected to an adjacent microcavity 305 through the facing second injection hole 307b.

The liquid crystal material 500 is divided into portions disposed at both sides of the break point BP. Since most of the liquid crystal material 500 is positioned in the first injection hole 307a direction with respect to the break point BP, the liquid crystal material 500 is partially injected into the microcavity 305 through the first injection hole 307a. Since the capillary force and the surface energy of the break point BP are higher than those around the break point BP) some of the liquid crystal material 500 positioned in the alignment material column 15 direction with respect to the break point BP moves toward the first injection hole 307a.

As illustrated in FIG. 11, a majority of the liquid crystal material 500 dropped in the first valley V1 is injected into the microcavity 305 through the first injection hole 307a. Only a relatively small amount of the liquid crystal material 500 is left in the first valley V1 at or adjacent to the alignment material column 15.

With reference to FIG. 1, when the display device according to the invention is actually manufactured by the method described for FIG. 9 to FIG. 11, it can be seen that the liquid crystal material 500 slightly left only at one edge of the first valley V1, but is not left at the remaining portion of the first valley V1.

As such, the liquid crystal material 500 is substantially not left in the first valley V1, and as a result, coating of the encapsulation layer 390 may be performed with little difficulty, and generation of spots in the display device may be reduced or effectively prevented.

While this invention has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A display device, comprising:
a substrate;
a pixel electrode on the substrate;
a roof layer on the pixel electrode and spaced apart from the pixel electrode,
a plurality of microcavities defined between the pixel electrode and the roof layer, each of which comprises a first edge opposite to a second edge thereof;
a light blocking member between two adjacent microcavities of the plurality of microcavities, overlapping the first edge of one microcavity of the two microcavities, and not overlapping the second edge of the other microcavity of the two microcavities;
an injection hole exposing an inner area of a microcavity;
a liquid crystal layer in the microcavity; and
an encapsulation layer on the roof layer, which covers the injection hole and seals the microcavity.

2. The display device of claim 1, wherein:
the light blocking member is between the pixel electrode and the roof layer.

3. The display device of claim 2, further comprising:
a first alignment layer on the pixel electrode;
a second alignment layer below the roof layer; and
an alignment material column connecting the first alignment layer and the second alignment layer to each other.

4. The display device of claim 3, further comprising
a first injection hole at a side of the first edge of the microcavity, and
a second injection hole at a side of the second edge of the microcavity.

5. The display device of claim 4, wherein:

the alignment material column is adjacent to the second injection hole.

6. The display device of claim 5, wherein:

the light blocking member overlaps the first injection hole.

7. The display device of claim 6, wherein:

the light blocking member does not overlap the second injection hole.

8. The display device of claim 7, wherein:

the light blocking member is spaced apart from the alignment material column in a plan view.

9. The display device of claim 2, wherein:

the light blocking member comprises a material having higher surface energy than that of the pixel electrode.

10. The display device of claim 2, further comprising:

a first insulating layer below the pixel electrode and the light blocking member.

11. The display device of claim 10, wherein:

the light blocking member comprises a material having higher surface energy than that of the first insulating layer.

12. The display device of claim 1, wherein:

the plurality of microcavities is in a matrix form in a plan view.

13. The display device of claim 12, wherein:

the two adjacent microcavities are vertically adjacent to each other.

14. The display device of claim 1, further comprising:

a thin film transistor connected with the pixel electrode, and between the two adjacent microcavities.

15. The display device of claim 14, wherein:

the light blocking member overlaps the thin film transistor.

16. The display device of claim 1, further comprising:

a common electrode below the roof layer.

17. The display device of claim 1, wherein:

the light blocking member contacts the liquid crystal layer.

* * * * *